(12) United States Patent
Lüders et al.

(10) Patent No.: US 6,793,245 B2
(45) Date of Patent: Sep. 21, 2004

(54) AIRBAG

(75) Inventors: Michael Lüders, Schechingen (DE); Norbert Ellerbrok, Rudersberg (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/054,797

(22) Filed: Jan. 23, 2002

(65) Prior Publication Data

US 2002/0109338 A1 Aug. 15, 2002

(30) Foreign Application Priority Data

Feb. 12, 2001 (DE) .................................... 201 02 421 U

(51) Int. Cl.[7] .............................................. B60R 21/16
(52) U.S. Cl. ................................ 280/743.1; 280/743.2
(58) Field of Search ....................... 280/730.1, 743.1, 280/743.2

(56) References Cited

U.S. PATENT DOCUMENTS

| | | | | |
|---|---|---|---|---|
| 5,362,101 A | * | 11/1994 | Sugiura et al. | 280/743.2 |
| 5,421,610 A | * | 6/1995 | Kavanaugh et al. | 280/743.1 |
| 5,489,119 A | * | 2/1996 | Prescaro et al. | 280/743.2 |
| 5,570,905 A | * | 11/1996 | Dyer | 280/743.2 |
| 5,678,858 A | * | 10/1997 | Nakayama et al. | 280/743.2 |
| 5,762,367 A | * | 6/1998 | Wolanin | 280/736 |
| 5,813,696 A | * | 9/1998 | Hill | 280/743.2 |
| 6,254,121 B1 | * | 7/2001 | Fowler et al. | 280/729 |
| 6,431,599 B1 | * | 8/2002 | Bohn | 280/743.1 |
| 2002/0067032 A1 | * | 6/2002 | Ishikawa | 280/743.1 |

FOREIGN PATENT DOCUMENTS

| | | |
|---|---|---|
| DE | 4224822 | 1/1993 |
| DE | 69303783 | 11/1996 |
| DE | 19813832 | 9/1999 |

* cited by examiner

Primary Examiner—Paul N. Dickson
Assistant Examiner—Toan C To
(74) Attorney, Agent, or Firm—Tarolli, Sundheim, Covell & Tummino L.L.P.

(57) ABSTRACT

The invention relates to an airbag for a vehicle occupant restraint system. The airbag comprises an airbag wall which has a front wall facing the occupant to be restrained, a back wall and a side wall. The front wall and the back wall are connected to each other by means of a detachable connection. This connection between the front wall and the back wall is severed by the unfolding of the side wall when the airbag is inflated.

5 Claims, 6 Drawing Sheets

AIRBAG

TECHNICAL FIELD

The invention relates to an airbag for a vehicle occupant restraint system.

BACKGROUND OF THE INVENTION

On inflation of an airbag, it can be advantageous if the airbag at first does not move in the direction to the vehicle occupant but towards the side instead. There are already proposals for controlling the unfolding direction of the airbag, for instance by deflecting the incoming gas by means of a fabric part in the airbag, as is described in DE 296 09 706. In another proposal disclosed in DE 200 09 816, the mid-section of the front wall of the airbag is attached to the back wall by fastening means. When the airbag is inflated, the fastening means are destroyed by the pressure or by the temperature of the gas flowing in.

BRIEF SUMMARY OF THE INVENTION

The object of the invention is to provide an airbag that reproducibly expands first in the direction of its side wall when it is inflated.

This is achieved in an airbag that comprises an airbag wall which has a front wall facing the occupant to be restrained, a back wall and a side wall. The front wall and the back wall are connected to each other by means of a detachable connection. This connection between the front wall and the back wall is severed by the unfolding of the side wall when the airbag is inflated. Since the front and back walls are connected to each other at the start of the inflation procedure, the side wall unfolds first. Only through the unfolding of the side wall is the connection severed, thus ensuring that, in any case, the airbag will first expand laterally.

Additional advantageous embodiments of the invention will be apparent from the subordinate claims.

DETAILED DESCRIPTION OF THE PREFERRED EMBODIMENTS

Figure 1:
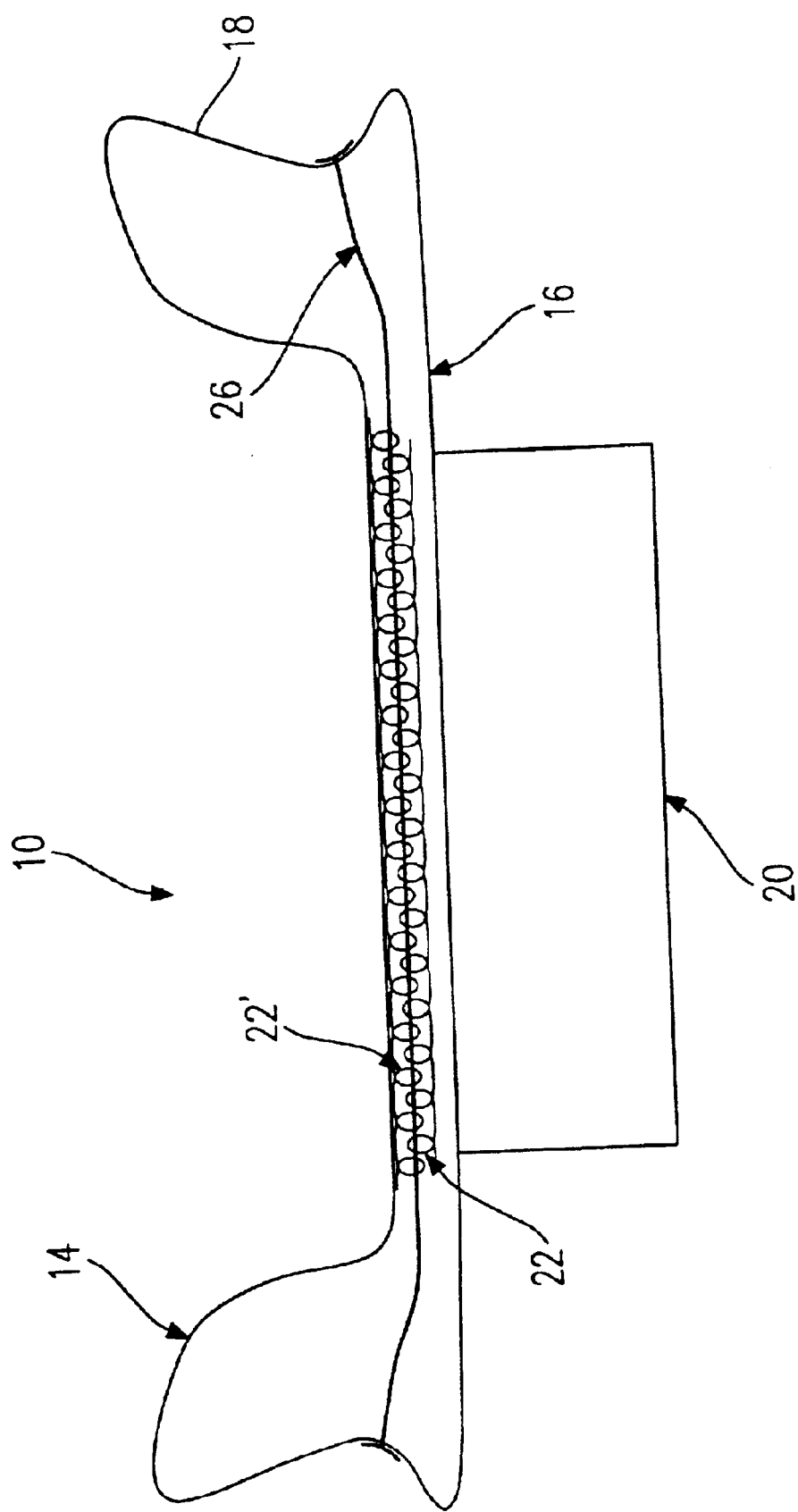
FIG. 1 shows a longitudinal section through the airbag according to the invention in a state at the beginning of unfolding.
Figure 2:
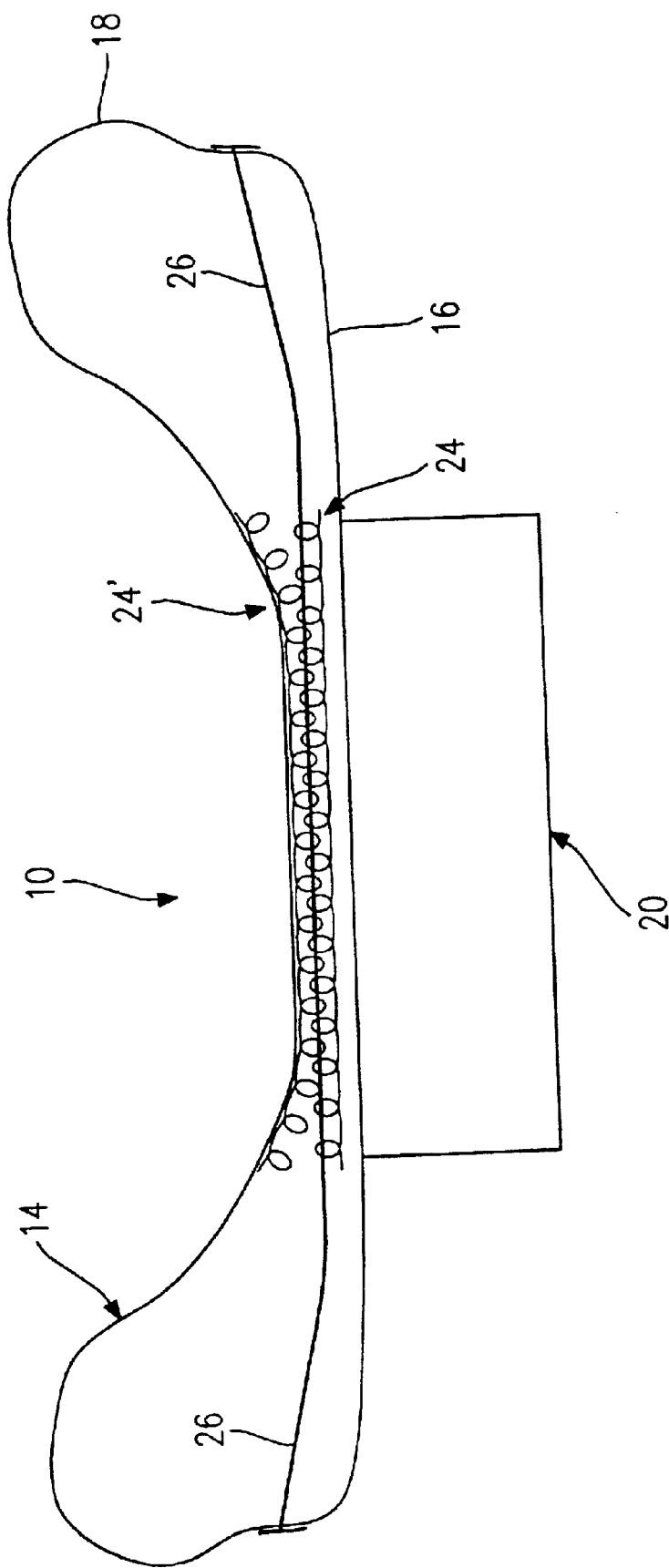
FIG. 2 shows a longitudinal section through the airbag of FIG. 1 in a state during unfolding.
Figure 3:
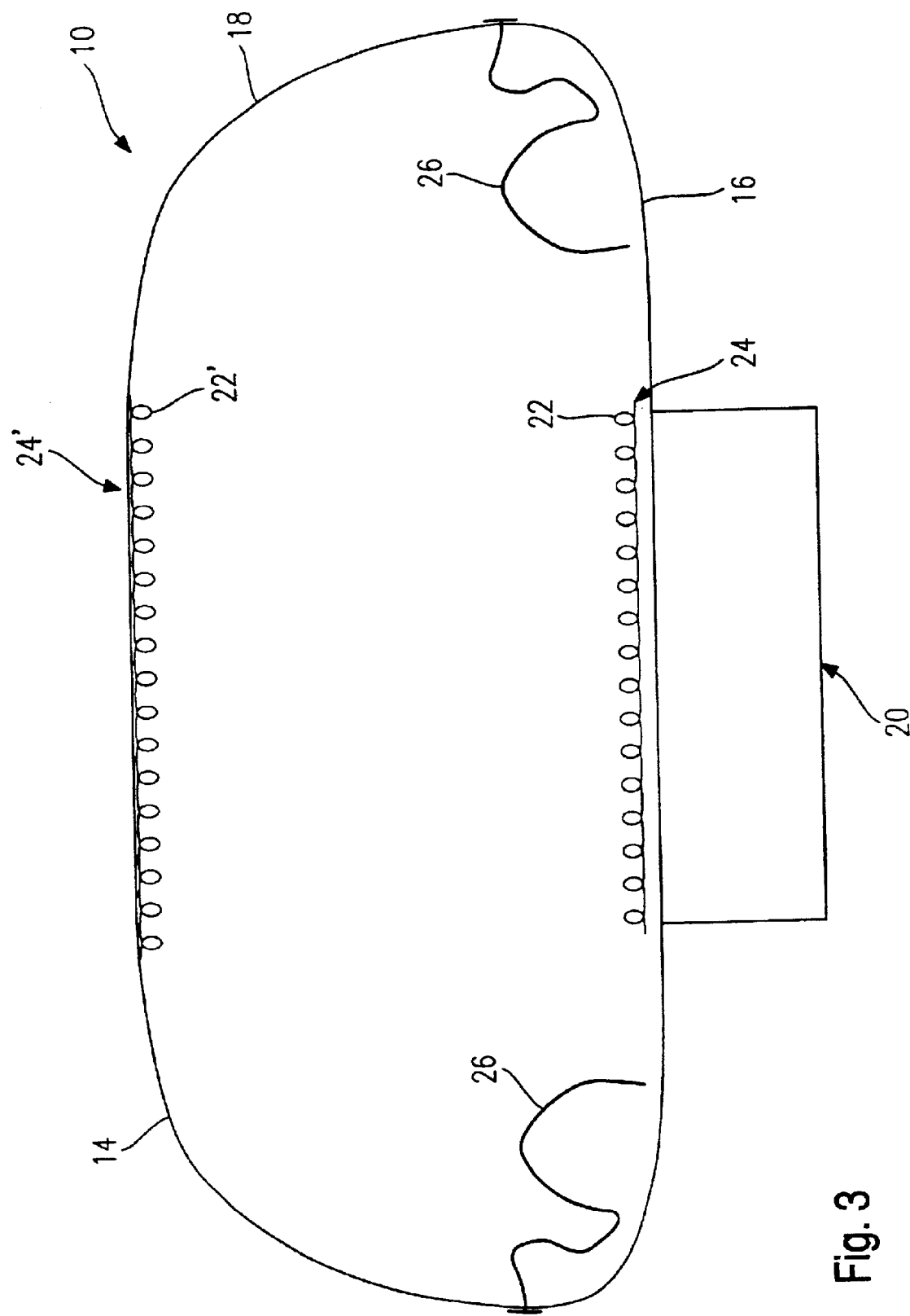
FIG. 3 shows a longitudinal section through the airbag of FIG. 2 in a completely unfolded state.
Figure 4:
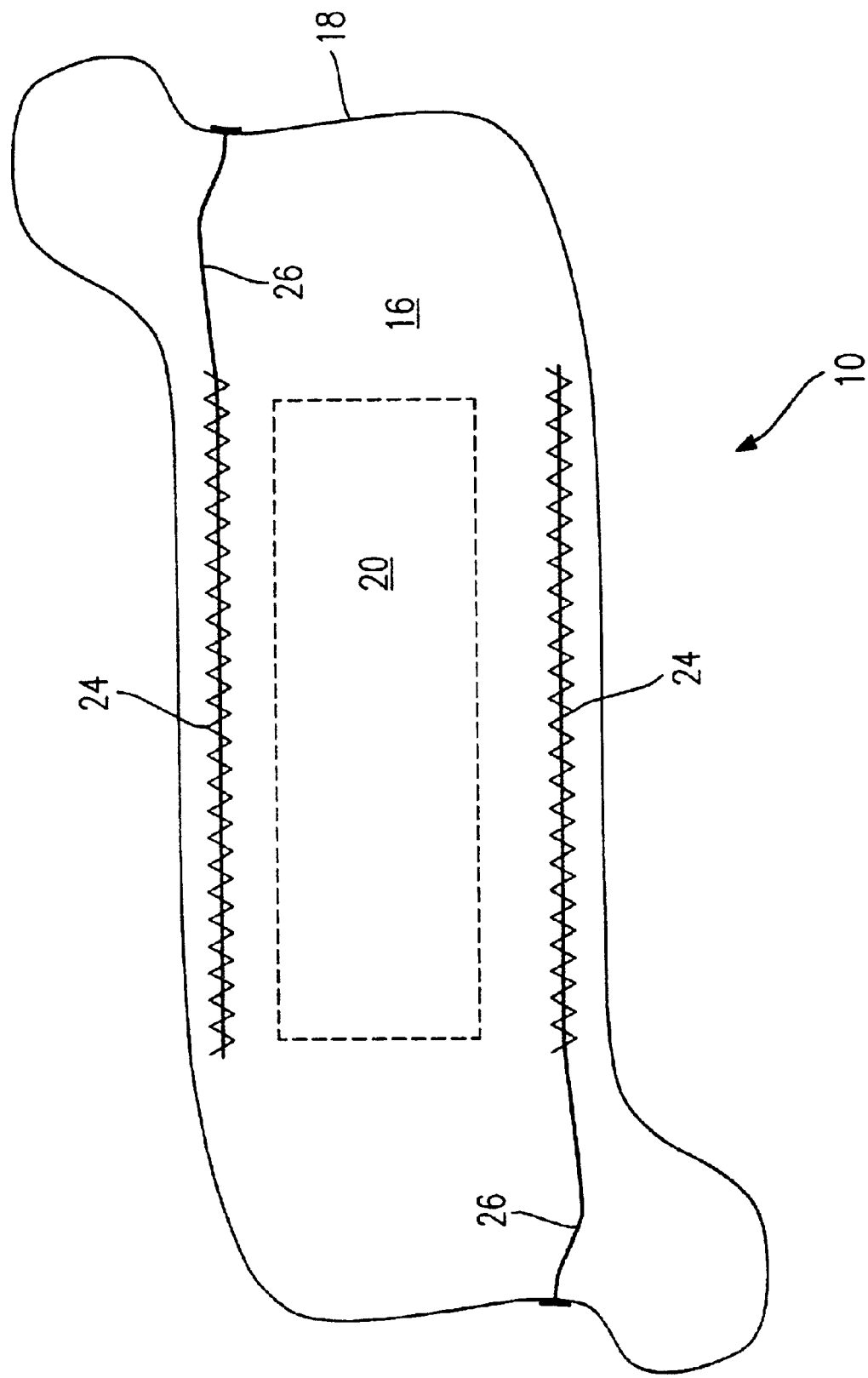
FIG. 4 shows a cross-section through the airbag of FIG. 1.
Figure 5:
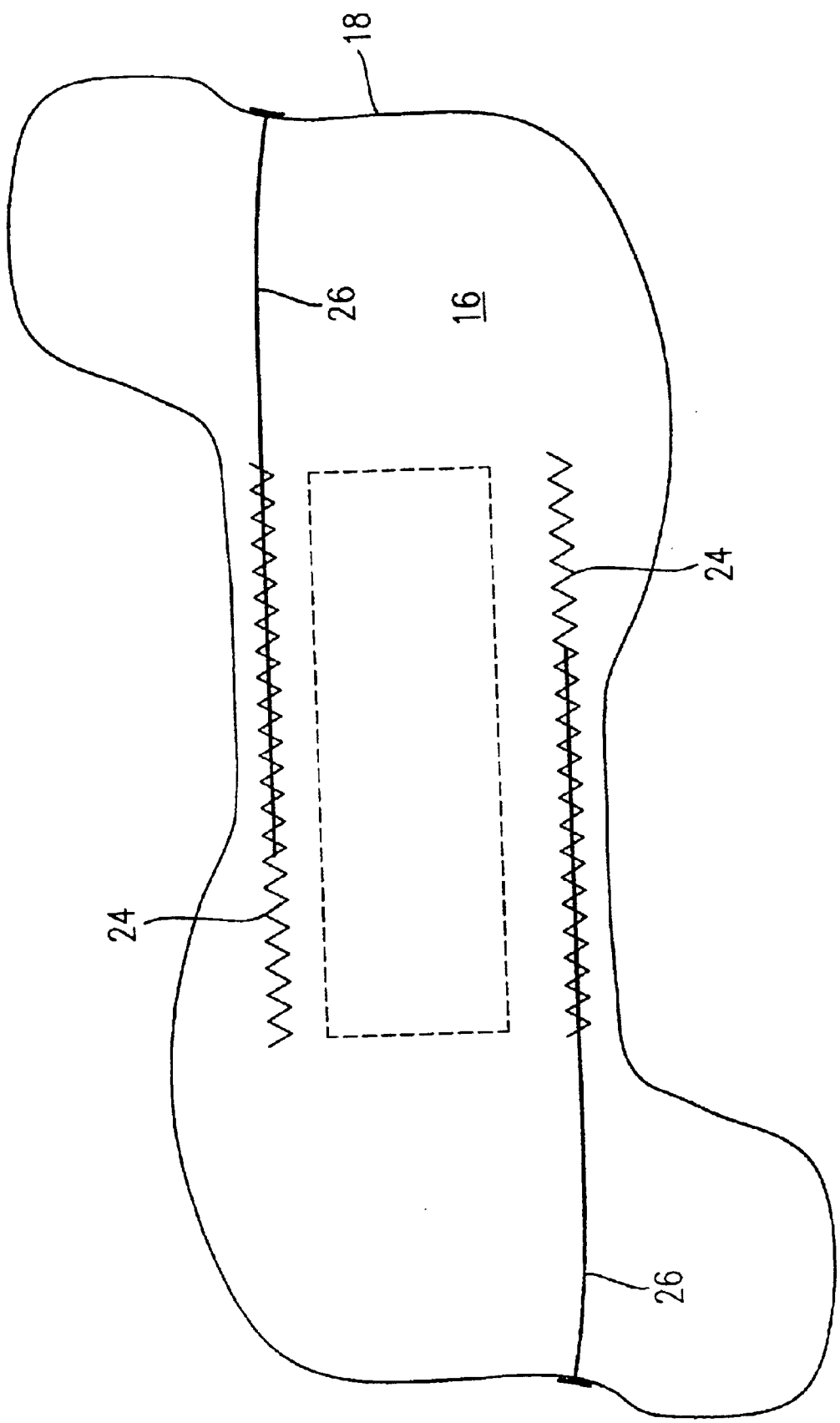
FIG. 5 shows a cross-section through the airbag of FIG. 2.
Figure 6:
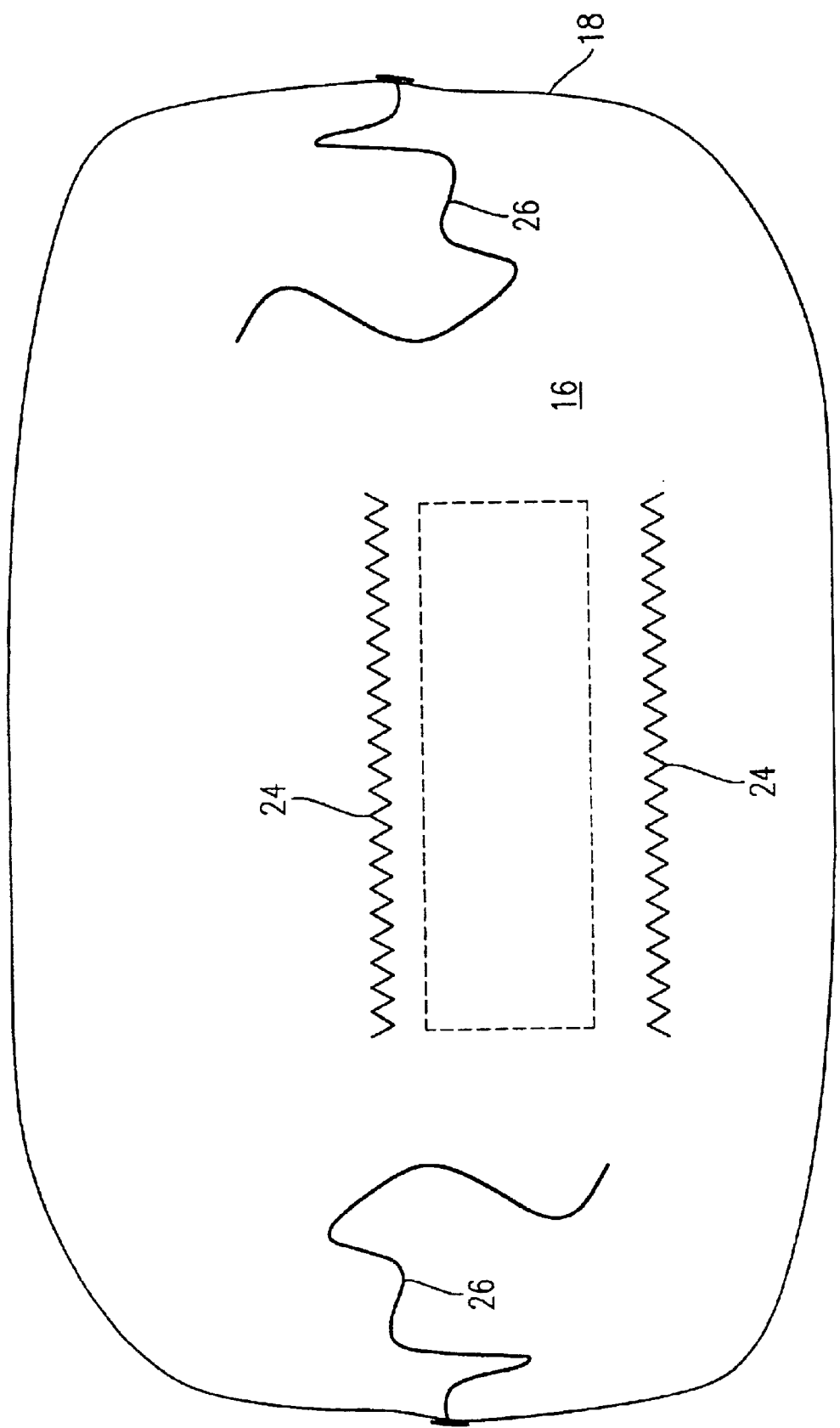
FIG. 6 shows a cross-section through the airbag of FIG. 3.

The airbag 10 according to the invention has an airbag wall with a front wall 14, a back wall 16 and a side wall 18. FIGS. 1 through 3 show the airbag 10 in three consecutive phases of the unfolding procedure, namely, in a schematic longitudinal section along a plane perpendicular to the front wall 14. The front wall 14 faces the occupant to be restrained; it faces upwards in FIGS. 1 through 3. The back wall 16 is connected to a gas generator 20 that generates the gas for inflating the airbag 10. FIGS. 4 through 6 show the airbag 10 in the same phases of the inflation procedure as in FIGS. 1 through 3, but in a schematic cross-section in a plane that is essentially parallel to the front wall 14. Here, the front wall 14 faces the observer and is depicted transparently in order to make the components located on the inside of the airbag 10 visible.

As can be seen in FIGS. 4 through 6, on the inside of the back wall 16, there are provided two parallel rows of loops 22, each in the form of elongated cylindrical spirals 24. On the inside of the front wall 14, there are likewise provided two spirals 24' with loops 22'. In this arrangement, the loops 22' of the spirals 24' engage in the interstices between the loops 22 of the spirals 24 on the back wall 16. In this manner, the loops 22 and 22' of each intermeshed pair of spirals 24, 24' enclose a cylindrical cavity into which a traction cable 26 is threaded. Thus, the traction cable forms a latching element for connecting the loops 22 and 22'. One end of each traction cable 26 is attached to the side wall 18, while the other end is left free. Therefore, at first, the front wall 14 is securely attached to the back wall 16.

When the airbag is inflated, the side wall 18 unfolds first since the incoming air cannot separate the front wall 14 from the back wall 16, as a result of which the airbag 10 first expands towards the sides (FIGS. 1 and 4, respectively). As a result of the unfolding of the side wall 18, however, the traction cable 26 is gradually pulled out of the loops 22, 22' (FIGS. 2 and 5, respectively). When the traction cable 26 is pulled completely out of the loops 22, 22' of the spirals 24, 24', the connection between the front wall 14 and the back wall 16 is severed, so that the airbag 10 can also unfold in the direction to the vehicle occupant so as to reach its full size (FIGS. 3 and 6, respectively).

In contrast to tear seams, with the loop connection according to the invention, there is no risk that the connection between the front wall 14 and the back wall 16 will be severed prematurely, for instance due to the flow pressure of the incoming gas.

Of course, the arrangement of the spirals 24, 24' shown here is only an example. Other suitable arrangements can also bring about different unfolding shapes of the airbag 10, for example, horseshoe or ring-shaped arrangements.

What is claimed is:

1. An air bag for a vehicle occupant restraint system, said airbag comprising an airbag wall which has a front wall facing an occupant to be restrained, a back wall and a side wall, said front wall and said back wall being connected to each other by means of a detachable connection such that said front wall cannot separate from said back wall as long as said connection remains in tact, said connection between said front wall and said back wall being severed as a consequence of unfolding of said side wall when said airbag is inflated.

2. An airbag for a vehicle occupant restraint system, said airbag comprising an airbag wall which has a front wall facing an occupant to be restrained, a back wall and a side wall, said front wall and said back wall being connected to each other by means of a detachable connection, said connection between said front wall and said back wall being severed by an unfolding of said side wall when said airbag is inflated, wherein said detachable connection is formed by at least one loop attached to said front wall and to said back wall, respectively, said loops being connected to each other by a latching element.

3. The airbag according to claim 2, wherein said latching element is a traction cable that is attached at one end to said side wall.

4. An air bag for a vehicle occupant restraint system, said air bag comprising an air bag wall which has a front wall portion facing an occupant to be restrained, a back wall portion and a side wall portion, said front wall portion and said back wall portion being connected to each other by means of a detachable connection, said detachable connection being functionally coupled to said side wall portion so that said connection between said front wall portion and said back wall portion is severed by an unfolding of said side wall portion when said air bag is inflated.

5. An air bag for a vehicle occupant restraint system, said air bag comprising an air bag wall which has a front wall portion facing an occupant to be restrained, a back wall portion and a side wall portion, said front wall portion and said back wall portion being connected to each other by means of a detachable connection, said detachable connection including an element coupled to said side wall portion for severing said detachable connection in response to an unfolding of said side wall portion when said air bag is inflated.

* * * * *